(12) United States Patent
Kawachi et al.

(10) Patent No.: US 10,018,767 B2
(45) Date of Patent: Jul. 10, 2018

(54) ILLUMINATION DEVICE WITH AT LEAST ONE MAIN EMISSION SURFACE HAVING A STEPPED SURFACE CONFIGURED TO REFLECT LIGHT IN MULTIPLE DIRECTIONS

(71) Applicant: PANASONIC INTELLECTUAL PROPERTY MANAGEMENT CO., LTD., Osaka (JP)

(72) Inventors: Hideharu Kawachi, Hyogo (JP); Shinichi Anami, Osaka (JP); Osamu Tanahashi, Kyoto (JP); Hiroyuki Sekii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 145 days.

(21) Appl. No.: 15/184,224

(22) Filed: Jun. 16, 2016

(65) Prior Publication Data

US 2016/0377794 A1  Dec. 29, 2016

(30) Foreign Application Priority Data

Jun. 25, 2015  (JP) .................................. 2015-127431

(51) Int. Cl.
*F21V 8/00* (2006.01)
*F21S 8/04* (2006.01)
(Continued)

(52) U.S. Cl.
CPC .............. *G02B 6/0045* (2013.01); *F21S 8/04* (2013.01); *F21V 7/0058* (2013.01); *F21V 7/22* (2013.01);
(Continued)

(58) Field of Classification Search
CPC .. G02B 6/0048; G02B 6/0045; G02B 6/0046; G02B 6/0036; G02B 6/0038;
(Continued)

(56) References Cited

U.S. PATENT DOCUMENTS

| 8,111,968 B2 * | 2/2012 | Chakmakjian ....... G02B 6/0028 |
| | | 349/121 |
| 9,366,799 B2 * | 6/2016 | Wilcox ................... F21S 8/061 |

(Continued)

FOREIGN PATENT DOCUMENTS

| JP | 2003-121840 | 4/2003 |
| JP | 2004-228018 | 8/2004 |

(Continued)

*Primary Examiner* — Robert May
(74) *Attorney, Agent, or Firm* — Greenblum & Bernstein, P.L.C.

(57) ABSTRACT

An illumination device includes a light source unit and a light guide plate configured to guide light coming from the light source unit. The light guide plate includes an incidence surface, main emission surfaces from which the light incident on the incidence surface is emitted, and an end emission surface which is opposed to the incidence surface and from which the light is emitted. At least one of the main emission surfaces has a stepped surface which is formed such that the thickness of the light guide plate becomes thinner at a side of the end emission surface than at a side of the incidence surface. The stepped surface is configured to reflect the light in a direction opposite to a light guide direction extending from the incidence surface toward the end emission surface and inclined with respect to the light guide direction.

10 Claims, 5 Drawing Sheets

(51) Int. Cl.
*F21V 7/00* (2006.01)
*F21V 7/22* (2018.01)
*F21V 13/02* (2006.01)
*F21Y 103/10* (2016.01)
*F21Y 115/10* (2016.01)

(52) U.S. Cl.
CPC .......... *F21V 13/02* (2013.01); *F21Y 2103/10* (2016.08); *F21Y 2115/10* (2016.08)

(58) Field of Classification Search
CPC . G02B 6/0063; F21V 17/0016; F21V 7/0016; F21V 7/0008
See application file for complete search history.

(56) References Cited

U.S. PATENT DOCUMENTS

| | | | |
|---|---|---|---|
| 9,733,411 B2 * | 8/2017 | Santoro | G02B 6/0045 |
| 2014/0211125 A1 | 7/2014 | Kurata | |
| 2014/0241009 A1 | 8/2014 | Kunimochi | |
| 2016/0161656 A1 * | 6/2016 | York | G02B 6/0006 362/612 |

FOREIGN PATENT DOCUMENTS

| | | |
|---|---|---|
| JP | 2005-251720 | 9/2005 |
| JP | 2009-199871 | 9/2009 |
| JP | 2014-146535 | 8/2014 |
| JP | 2014-164995 | 9/2014 |

* cited by examiner

ILLUMINATION DEVICE WITH AT LEAST ONE MAIN EMISSION SURFACE HAVING A STEPPED SURFACE CONFIGURED TO REFLECT LIGHT IN MULTIPLE DIRECTIONS

CROSS-REFERENCE TO RELATED APPLICATIONS

This application claims priority to Japanese Patent Application No. 2015-127431 filed on Jun. 25, 2015, the entire contents of which are incorporated herein by reference.

TECHNICAL FIELD

The disclosure relates to an illumination device provided with a light guide plate.

BACKGROUND ART

In the related art, there is known an illumination device provided with a light guide plate which guides the light emitted from a light source unit and which emits the light outward (see, e.g., Japanese Unexamined Patent Application Publication No. 2004-228018A). The light guide plate includes an incidence surface on which the light emitted from the light source unit is incident. The light guide plate emits the light incident on the incidence surface to the outside from both main surfaces while guiding the light toward an emission end surface opposed to the incidence surface.

However, if the aforementioned illumination device is installed on a ceiling with the light guide plate kept orthogonal to the ceiling, the amount of light emitted from the light guide plate to be directed toward the ceiling is small. Thus, there may be a case where the ceiling around the illumination device is dark and the illuminated space is felt narrow, thereby generating an oppressive feeling.

SUMMARY OF THE INVENTION

In view of the above, the disclosure provides an illumination device provided with a light guide plate, which is capable of brightly illuminating a ceiling around the illumination device and eliminating an oppressive feeling even when the illumination device is installed on the ceiling with the light guide plate kept orthogonal to the ceiling.

In accordance with an aspect, there is provided an illumination device including a light source unit and a light guide plate configured to guide light from the light source unit and to emit the light outward. The light guide plate includes an incidence surface which constitutes one end surface of the light guide plate and on which the light from the light source unit is incident, main emission surfaces which constitute opposite surfaces of the light guide plate and from which the light incident on the incidence surface is emitted, and an end emission surface which is opposed to the incidence surface and from which the light is emitted. At least one of the main emission surfaces has a stepped surface which is formed such that the thickness of the light guide plate becomes thinner at a side of the end emission surface than at a side of the incidence surface. The stepped surface is configured to reflect the light in a direction opposite to a light guide direction extending from the incidence surface toward the end emission surface and inclined with respect to the light guide direction.

According to the illumination device of the disclosure, even when the illumination device is installed on the ceiling with the light guide plate kept orthogonal to the ceiling, the light reflected by the stepped surfaces is directed toward the ceiling. It is therefore possible to brightly illuminate the ceiling around the illumination device and to eliminate an oppressive feeling.

BRIEF DESCRIPTION OF THE DRAWINGS

The figures depict one or more implementations in accordance with the present teaching, by way of example only, no by way of limitations. In the figures, like reference numerals refer to the same or similar elements.

DETAILED DESCRIPTION OF THE PREFERRED EMBODIMENTS

Figure 1:
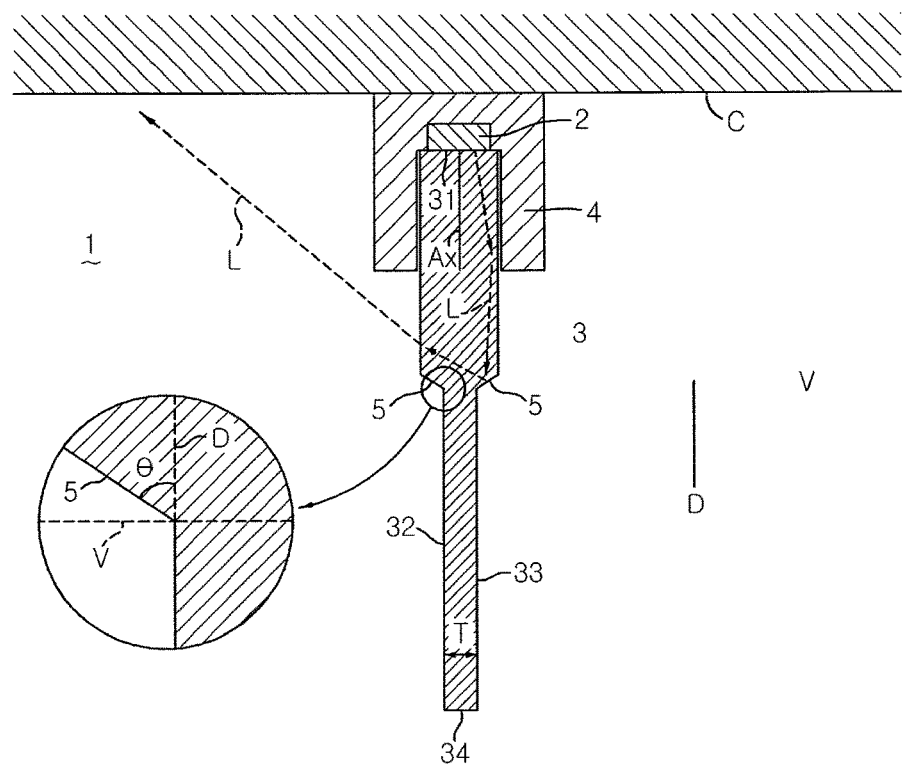
FIG. 1 is a side sectional view of an illumination device according to a first embodiment with a portion thereof enlarged.

An illumination device according to a first embodiment will be described with reference to FIG. 1. The illumination device 1 includes a light source unit 2, a light guide plate 3 configured to guide light L (indicated by broken-line arrows) from the light source unit 2 and to emit the light L outward, and a case 4 configured to hold the light source unit 2 and the light guide plate 3. The case 4 is mounted to a ceiling C and is configured to hold the light guide plate 3 to be orthogonal to the ceiling C. For example, the light source unit 2 includes, as a light source, a white LED (not illustrated) which emits white light. The white LED is disposed so that the optical axis Ax thereof is oriented in a vertical direction.

The light guide plate 3 is made of a light-transmitting material such as a transparent acryl plate or the like. The light guide plate 3 includes an incidence surface 31 which constitutes one end surface of the light guide plate 3 and on which the light coming from the light source unit 2 is incident, main emission surfaces 32 and 33 which constitute opposite main surfaces of the light guide plate 3 and from which the light incident on the incidence surface 31 is emitted, and an end emission surface 34 which is opposed to the incidence surface 31 and from which the light is emitted. The light guide plate 3 is disposed so that the incidence surface 31 faces toward the light source unit 2 and so that the main emission surfaces 32 and 33 are parallel to an optical axis Ax.

The main emission surfaces 32 and 33 include stepped surfaces 5 which are formed so that the thickness T of the light guide plate 3 becomes thinner at the side of the end emission surface 34 than at the side of the incidence surface 31. The stepped surfaces 5 are provided on the main emission surfaces 32 and 33 in a position close to the incidence surface 31. Portions of the main emission surfaces 32 and 33 between the stepped surfaces 5 and the end emission surface 34 have fine dot structures (not illustrated) for controlling light distribution of emitted light. The dot structures are formed by, for example, micro prism processing. The stepped surfaces 5 are formed of slant surfaces inclined with respect to a direction V orthogonal to a light guide direction D extending from the incidence surface 31 to the end emission surface 34. In the illustrated example, the stepped surfaces 5 are formed of slant surfaces inclined toward the ceiling C (upward) as the slant surfaces extend outward. An acute angle θ made by each of the stepped surfaces 5 and the light guide direction D is set at 50° to 70°, preferably 60°.

If the acute angle θ is set as above, the stepped surfaces 5 efficiently reflect the light L in a direction opposite to the light guide direction D and inclined with respect to the light guide direction D. Thus, the light L is directed toward the ceiling C. It is therefore possible to brightly illuminate the ceiling C around the illumination device 1 and to enable a person to feel an illuminated space wide, thereby eliminating an oppressive feeling. Since a part of the light L guided through the light guide plate 3 is reflected by the stepped surfaces 5, the amount of the light L arriving at the end emission surface 34 becomes small. It is therefore possible to prevent the brightness of the end emission surface 34 from being excessively increased. This makes it possible to improve the appearance of the illumination device 1.

Figure 2:
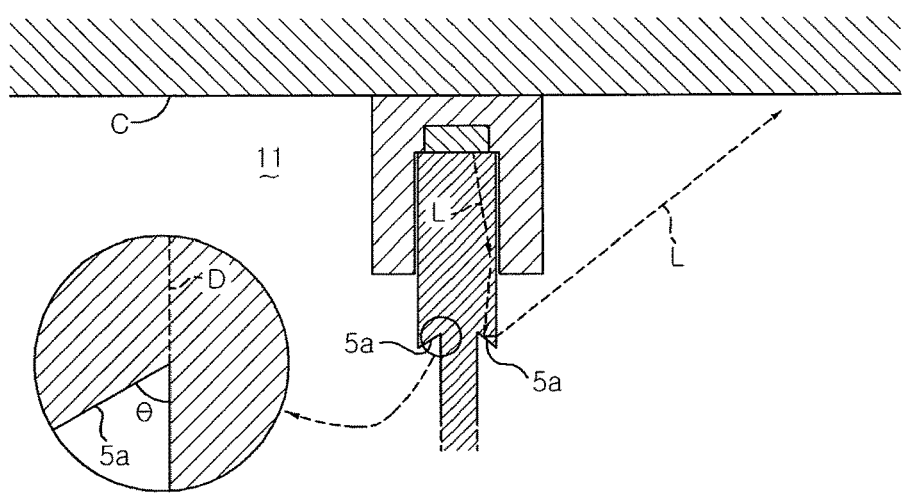
FIG. 2 is a side sectional view of an illumination device according to a modification of the first embodiment with a portion thereof enlarged.

Next, an illumination device according to a modification of the aforementioned embodiment will be described with reference to FIG. 2. The illumination device 11 includes stepped surfaces 5a formed of slant surfaces inclined toward a floor surface (downward) as the slant surfaces extend outward. Similar to the case of the illumination device 1 described above, an acute angle θ made by each of the stepped surfaces 5a and the light guide direction D is set at 50° to 70°, preferably 60°. According to the illumination device 11 configured as above, it is possible for the stepped surfaces 5a to efficiently reflect the light L toward the ceiling C. This makes it possible to achieve the same effects as achieved by the aforementioned illumination device 1.

Figure 3A:
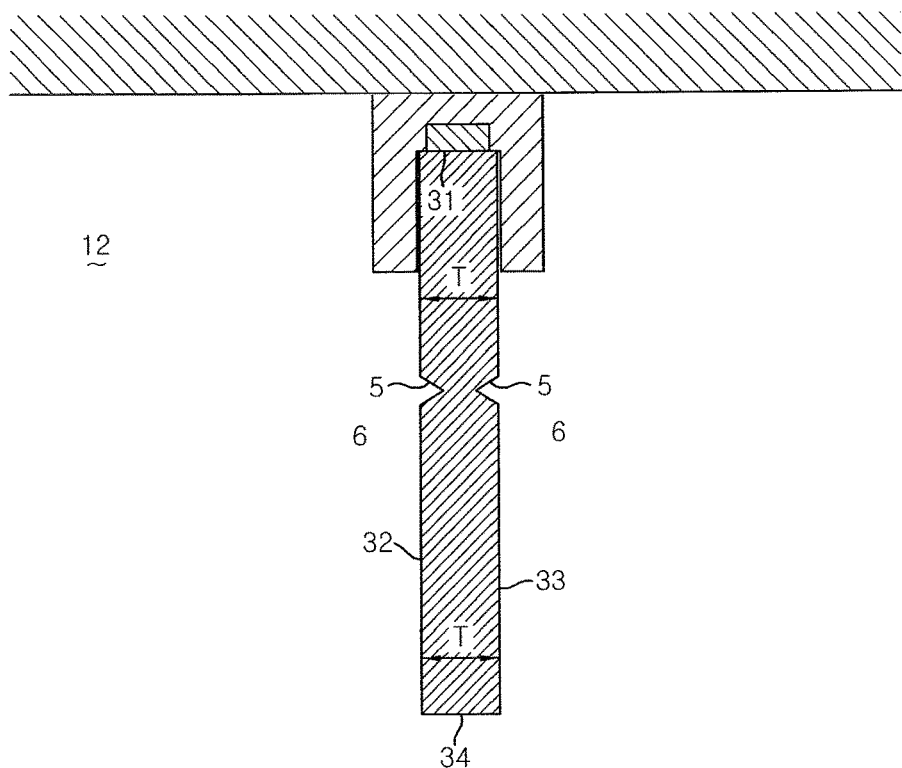
FIGS. 3A and 3B are side sectional views of illumination devices according to a second embodiment and third embodiment.
Figure 3B:
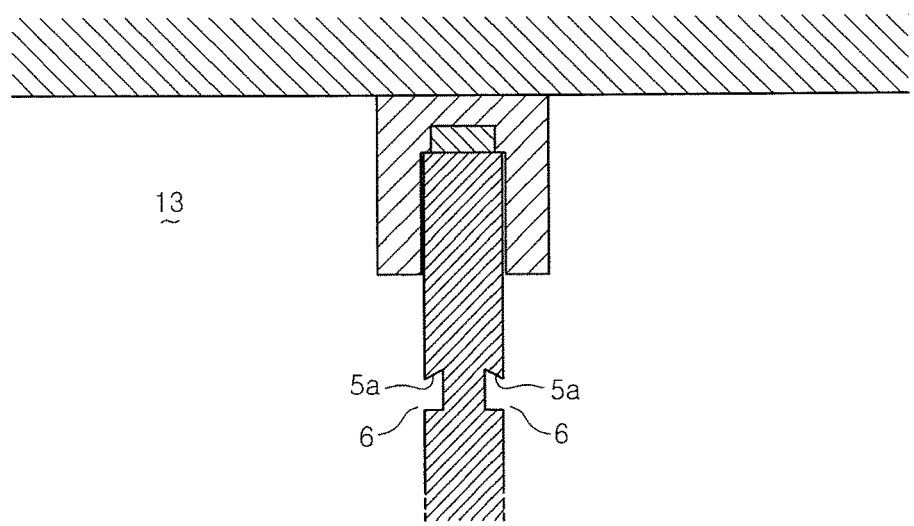

Next, illumination devices according to a second embodiment and a third embodiment will be described with reference to FIGS. 3A and 3B. In an illumination device 12 illustrated in FIG. 3A, stepped surfaces 5 define some portions of grooves 6 formed on the main emission surfaces 32 and 33. The light guide plate 3 has a uniform thickness T at the side of the incidence surface 31 and at the side of the end emission surface 34. The grooves 6 are formed in, for example, a V-shape when viewed in a cross-section. As compared with the case where the thickness T of the light guide plate 3 is changed through the stepped surfaces 5 as in the aforementioned illumination devices 1 and 11, the grooves 6 can be formed by easier processing. Thus, according to the illumination device 12, it is possible to easily manufacture the light guide plate 3 while achieving the same effects as achieved by the illumination devices 1 and 11. In an illumination device 13 illustrated in FIG. 3B, stepped surfaces 5a define some portions of grooves 6. According to this illumination device 13, it is possible to achieve the same effects as achieved by the illumination device 12.

Figure 4A:
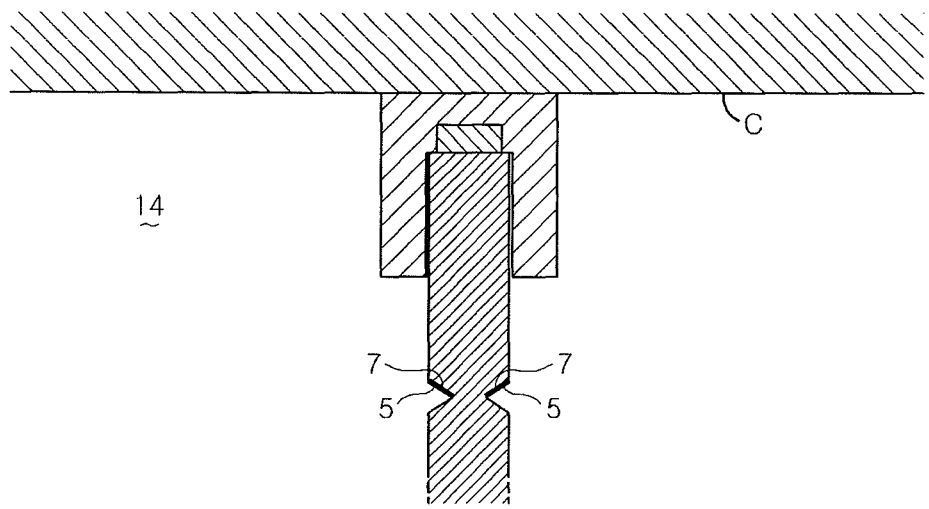
FIGS. 4A and 4B are side sectional views of illumination devices according to modifications of the second embodiment.

Next, illumination devices according to modifications of the aforementioned embodiment will be described with reference to FIGS. 4A and 4B. As illustrated in FIG. 4A, an illumination device 14 is based on the illumination device 12 described above and is configured to have light-impervious stepped surfaces 5 formed by, for example, applying a white coating 7 on the stepped surfaces 5. This enables the stepped surfaces 5 to reliably reflect the light toward the ceiling C.

Figure 4B:
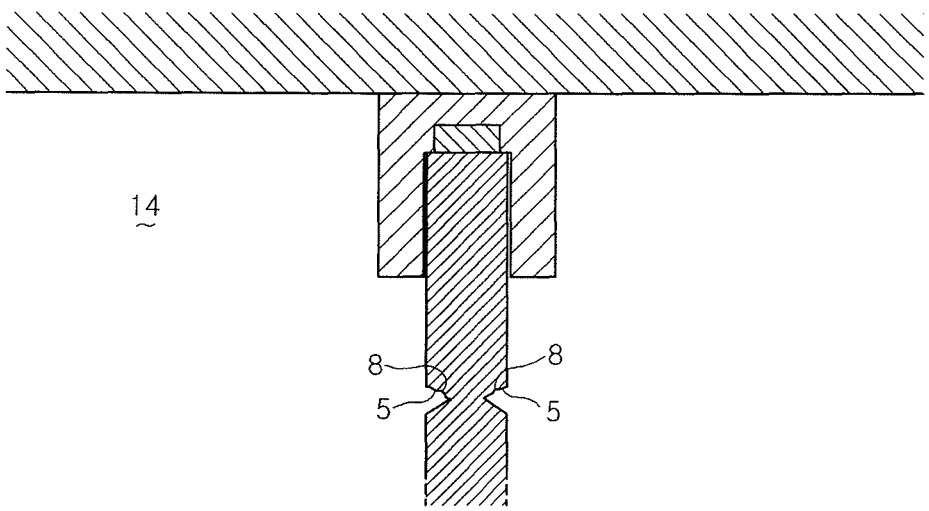

As illustrated in FIG. 4B, an illumination device 15 is based on the illumination device 12 described above and is configured to have light-diffusive stepped surfaces 5. The light diffusivity is applied by, for example, forming fine uneven structures 8 on the stepped surfaces 5 or bonding light-diffusive sheets to the stepped surfaces 5. This enables the stepped surfaces 5 to diffusively reflect the light. This also makes it possible to prevent the stepped surfaces 5 from becoming conspicuous due to the light distribution change occurring on the stepped surfaces 5.

Figure 5A:
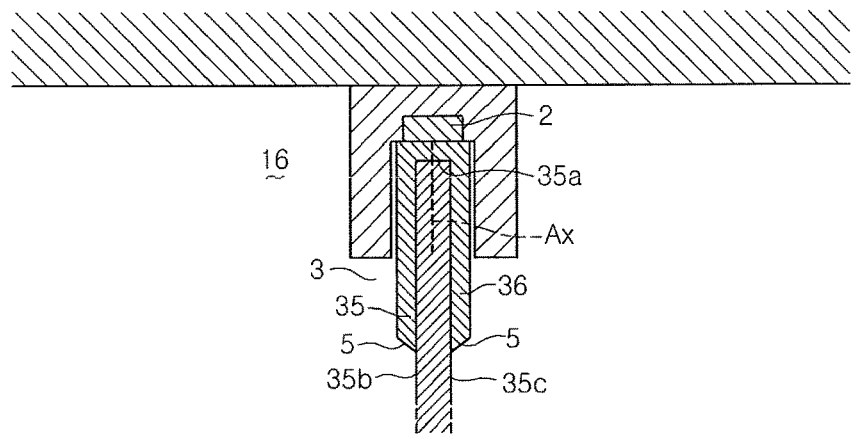
FIGS. 5A, 5B and 5C are side sectional views of illumination devices according to a fourth embodiment, a fifth embodiment and a sixth embodiment.
Figure 5B:
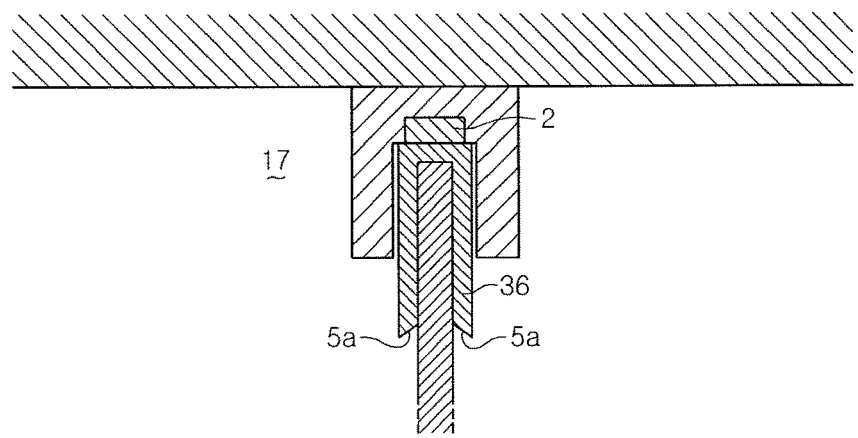

Next, illumination devices according to a fourth embodiment, a fifth embodiment and a sixth embodiment will be described with reference to FIGS. 5A to 5C. In an illumination device 16 illustrated in FIG. 5A, a light guide plate 3 includes a first light guide plate 35 and a second light guide plate 36. The first light guide plate 35 is formed in a flat plate shape so as to have a uniform thickness. The first light guide plate 35 is disposed so that one side surface 35a thereof faces toward the light source unit 2 and so that the opposite main surfaces 35b and 35c are parallel to the optical axis Ax. The second light guide plate 36 is configured to cover some portions of the main surfaces 35b and 35c and the side surface 35a of the first light guide plate 35 and is formed in a substantially C-like shape when viewed in a cross section. The second light guide plate 36 has stepped surfaces 5 formed at the ends thereof distant from the light source unit 2. The first light guide plate 35 and the second light guide plate 36 are made of, for example, the same light-transmitting material or light-transmitting materials having a substantially equal refractive index. The first light guide plate 35 and the second light guide plate 36 are bonded to each other by a light-transmitting adhesive agent.

According to this illumination device 16, it is possible to achieve the same effects as achieved by the aforementioned illumination device 1. Furthermore, it is possible to form the light guide plate 3 by combining the first light guide plate 35 formed in a simple flat plate shape and the second light guide plate 36 provided with the stepped surfaces 5. Therefore, for example, as compared with a case where the light guide plate 3 is formed by cutting a flat plate, it is possible to easily form the light guide plate 3. In an illumination device 17 illustrated in FIG. 5B, the second light guide plate 36 has stepped surfaces 5a formed at the ends thereof distant from the light source unit 2. According to this illumination device 17, it is possible to achieve the same effects as achieved by the aforementioned illumination device 16.

Figure 5C:
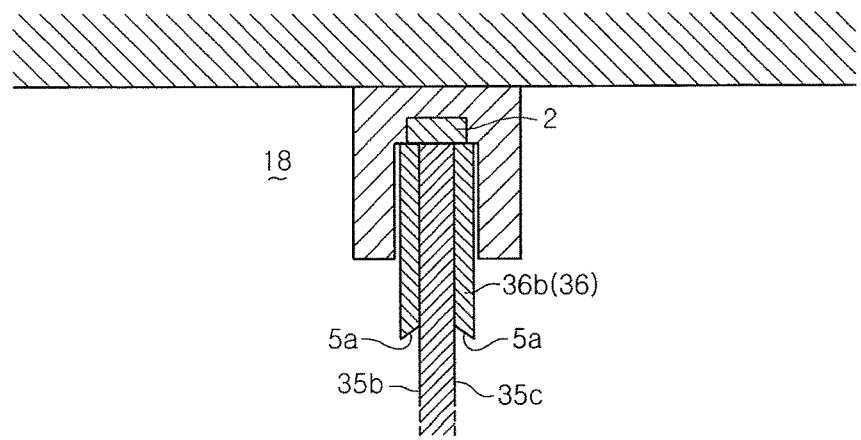

In an illumination device 18 illustrated in FIG. 5C, the second light guide plate 36 includes second light guide plate members 36a and 36b formed in a flat plate shape at a uniform thickness. The second light guide plate members 36a and 36b have stepped surfaces 5a formed at the ends thereof distant from the light source unit 2 and cover some portions of the main surfaces 35b and 35c of the first light guide plate 35. According to this illumination device 18, the first light guide plate 35 and the second light guide plate 36 are formed in a simple flat plate shape. Therefore, as compared with the aforementioned illumination devices 16 and 17, it is possible to easily form the light guide plate 3.

Figure 6:
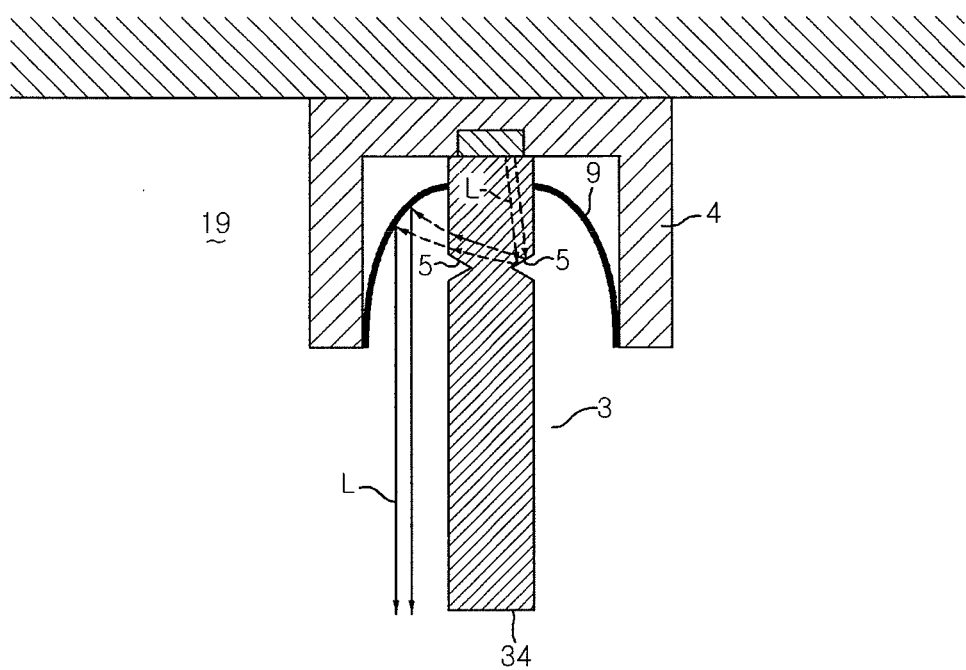
FIG. 6 is a side sectional view of an illumination device according to a seventh embodiment.

Next, an illumination device according to a seventh embodiment will be described with reference to FIG. 6. An illumination device 19 is based on the illumination device 12 described above and is further provided with a reflection plate 9 which reflects the light L reflected by the stepped surfaces 5 toward the floor surface. The reflection plate 9 is made of a material having high light reflectivity, e.g., aluminum, and is held in a space between the light guide plate 3 and the case 4 so as to cover the stepped surfaces 5. The provision of the reflection plate 9 helps increase the amount of light directed toward the floor surface. Thus, the high brightness light emission on the end emission surface 34 of the light guide plate 3 becomes less conspicuous. It is therefore possible to obtain natural irradiation light.

The illumination device according to the disclosure is not limited to the aforementioned embodiments and the modifications thereof. For example, it is not always necessary to provide the stepped surfaces on the two main emission surfaces. One stepped surface may be provided on at least one of the main emission surfaces. Moreover, a plurality of stepped surfaces may be provided on one of the main emission surfaces. In the illumination devices other than the illumination device 12, the stepped surfaces may be light-impervious or light-diffusive.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination device, comprising:
   a light source; and
   a light guide plate configured to guide light from the light source and to emit the light outwardly, wherein
   the light guide plate includes
      an incidence surface which constitutes one end surface of the light guide plate and on which the light from the light source is incident,
      main emission surfaces which constitute opposite main surfaces of the light guide plate and from which the light incident on the incidence surface is emitted, and
      an end emission surface which is opposed to the incidence surface and from which the light incident on the incidence surface is emitted,
   at least one of the main emission surfaces has a stepped surface which is formed such that the thickness of the light guide plate becomes thinner at the end emission surface than at the incidence surface, and
   the stepped surface is configured to reflect the light incident on the incidence surface in a direction away from the end emission surface and inclined with respect to a light guide direction extending from the incidence surface toward the end emission surface.

2. The device of claim 1, wherein the stepped surface is formed of a slant surface inclined with respect to a direction orthogonal to the light guide direction.

3. The device of claim 1, wherein the stepped surface is a light translucent surface.

4. The device of claim 1, wherein the stepped surface is a light impermeable surface.

5. The device of claim 1, wherein the stepped surface is a light diffusive surface.

6. An illumination device, comprising:
   a light source; and
   a light guide plate configured to guide light from the light source and to emit the light outwardly, wherein
   the light guide plate includes
      an incidence surface which constitutes one end surface of the light guide plate and on which the light from the light source is incident,
      main emission surfaces which constitute opposite main surfaces of the light guide plate and from which the light incident on the incidence surface is emitted, and
      an end emission surface which is opposed to the incidence surface and from which the light incident on the incidence surface is emitted,
   at least one of the main emission surfaces has a stepped surface which is configured to reflect the light incident on the incidence surface in a direction away from the end emission surface and inclined with respect to a light guide direction extending from the incidence surface toward the end emission surface, and
   the light guide plate includes
      a first light guide plate having a uniform thickness and
      a second light guide plate configured to cover a portion of main surfaces of the first light guide plate and provided with the stepped surface.

7. The device of claim 6, wherein the stepped surface is formed of a slant surface inclined with respect to a direction orthogonal to the light guide direction.

8. The device of claim 6, wherein the stepped surface is a light translucent surface.

9. The device of claim 6, wherein the stepped surface is a light impermeable surface.

10. The device of claim 6, wherein the stepped surface is a light diffusive surface.

* * * * *